Koch-Bossard et al.

[15] 3,656,845
[45] Apr. 18, 1972

[54] LIGHT-POINT-PROJECTOR

[72] Inventors: Ernst Koch-Bossard, Moosstrasse 11, CH6000 Luzerne; Max August Pietsch-Faber, Im Klasterhof, CH8598 Bottighogen, Thurgau, both of Switzerland

[22] Filed: Jan. 23, 1970

[21] Appl. No.: 5,318

[30] Foreign Application Priority Data

Nov. 13, 1969  Germany..................P 19 57 108.5

[52] U.S. Cl. ........................353/42, 33/50 A, 240/6.41
[51] Int. Cl. ........................................................G03b 21/00
[58] Field of Search ..................353/42, 43; 33/50 R, 50 A; 240/6.41

[56] References Cited
UNITED STATES PATENTS

| 2,085,732 | 7/1937 | Baxter et al............................240/6.41 |
| 2,597,565 | 5/1952 | Chandler et al. ......................240/6.41 |
| 2,357,542 | 9/1944 | Pfeil......................................353/42 |

FOREIGN PATENTS OR APPLICATIONS

| 463,383 | 4/1951 | Italy.......................................240/6.41 |
| 609,617 | 10/1948 | Great Britain........................240/6.41 |

*Primary Examiner*—William D. Martin, Jr.
*Attorney*—Lackenbach and Lackenbach

[57] ABSTRACT

Aiming projector for attachment to a gun, or the like, for assisting in aiming thereof by providing, from a single light source, a projected bright spot indicating the point of aim and generalized illumination of the area of aim to a lower intensity.

10 Claims, 10 Drawing Figures

PATENTED APR 18 1972 3,656,845
SHEET 1 OF 3
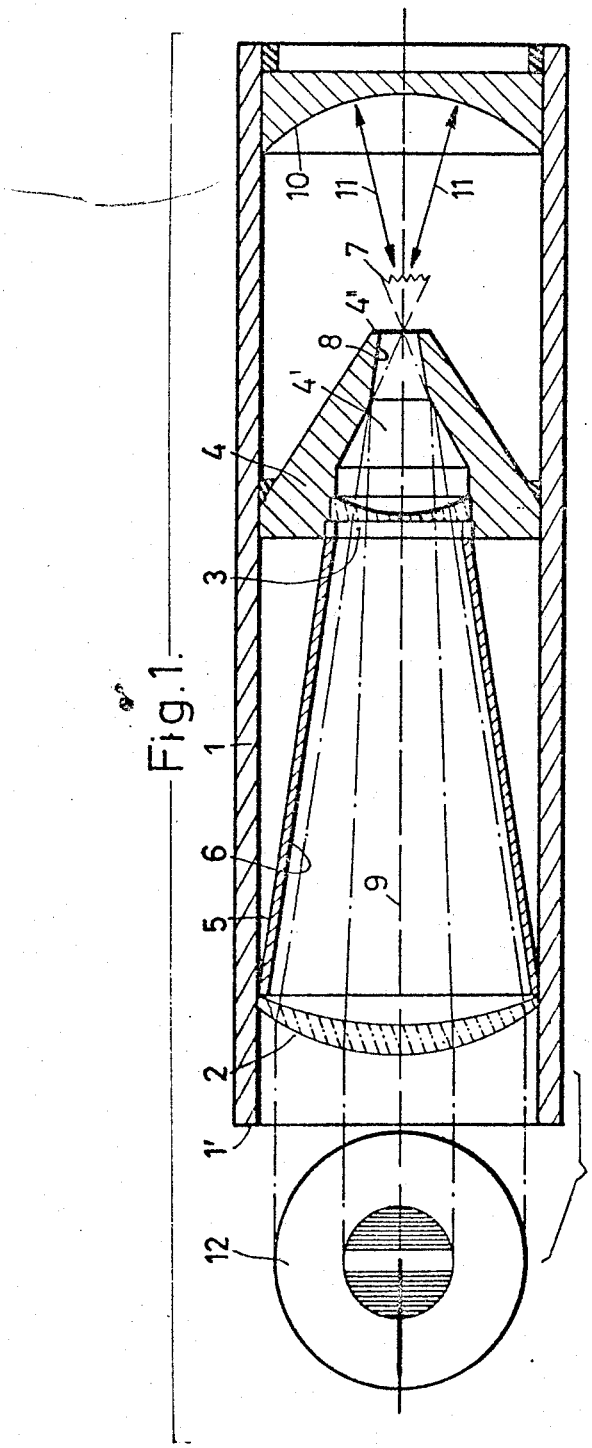
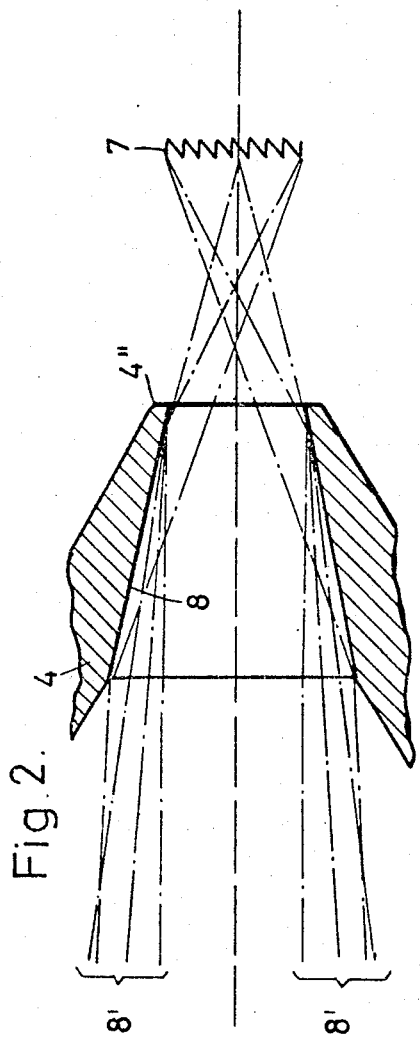
INVENTORS
E. KOCH-BOSSHARD
M. A. PIETSCH-FABER
By
Rackenbach & Rackenbach
Attorneys

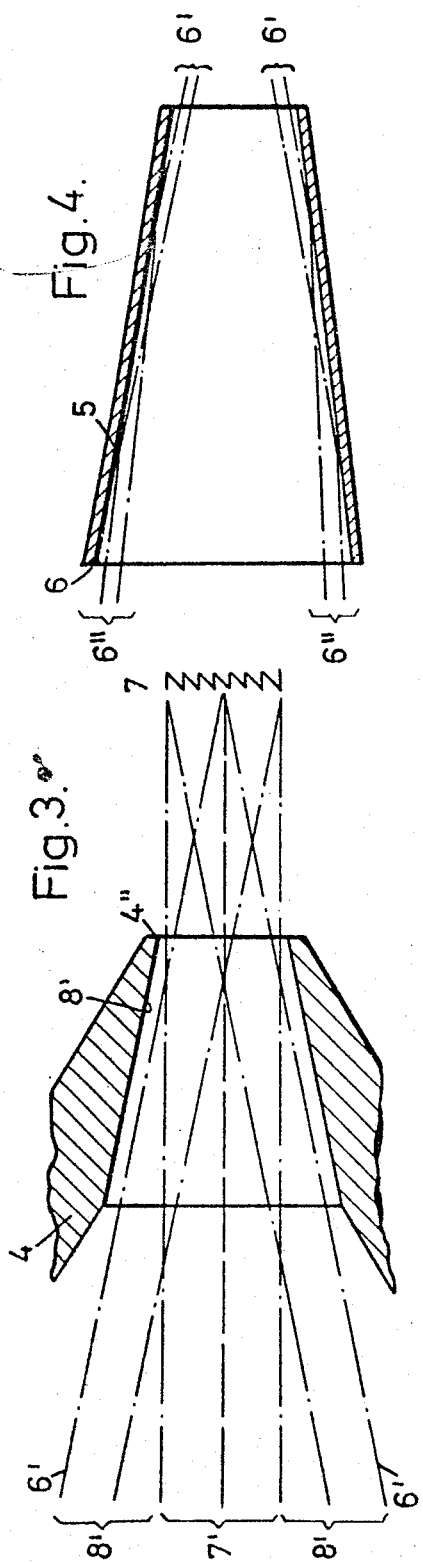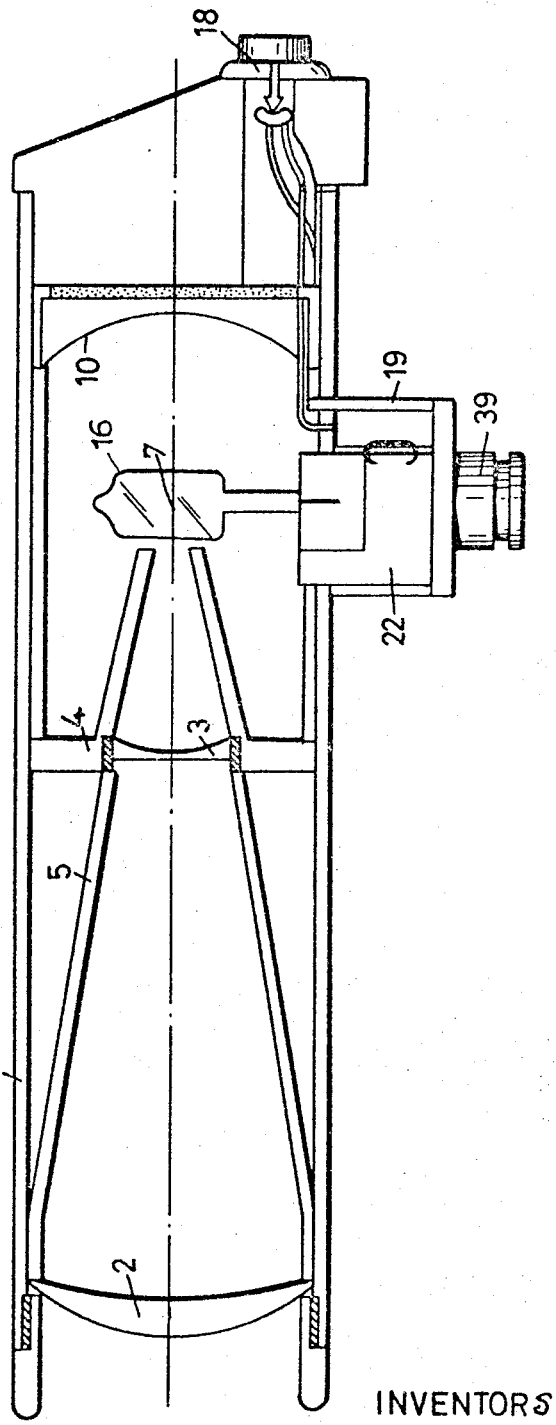

PATENTED APR 18 1972 3,656,845

INVENTORS
E. KOCH-BOSSHARD
M. A. PIETSCH-FABER
By
Rackenbach & Rackenbach
Attorneys

LIGHT-POINT-PROJECTOR

The invention relates to an aiming projector for the sighting of an object by means of a light mark and for the simultaneous illumination of the object. Such aiming projectors are especially suitable for use with small arms such as rifles, submachine guns, machine guns, rocket firing tubes or even anti-tank guns.

If such an aiming projector is placed on the barrel of the small-arm, upon switching on the projector the target aimed at can be illuminated at the same time.

For use in hunting pocket lamps are know which give off a particularly chargely defined light beam. Such lamps are in particular placed on shotguns and co-ordinated with them such that it is possible also to fire a shot, aimed to a certain extent in the dark, in the field illuminated by the pocket lamp. If the light beam is too closely defined it does indeed give a usable aiming point but the object lying at the aiming point cannot be sufficiently well recognized. If therefore the light beam is less well defined so that the surroundings can also be better illuminated then due to the surroundings producing loss of definition of the limits of the light field may occur and therefore its centre can no longer be sufficiently accurately determined whereby of course the accuracy of aim suffers.

The invention is based on the problem of providing a target projector which is suitable in particular for use with weapons and which gives an accurate aiming point for the sighting of the target as well as also a sufficient brightness around this aiming point so that the type of target and its surroundings can be well seen thus, the target projector is capable of being mounted on such a weapon quickly and simply, for example, even when the user is wearing gloves, and can be easily adjusted on its barrel. The control should also be simple, for example, be capable of being effected by means of a push button whereby it is ensured that the target projector can be switched on and off also independently of the operation of the weapon.

This problem is solved according to the invention in a target projector for the sighting of an object by a light marking and at the same time illuminating of the object wherein the light marking is the light source sharply reflected, for example, via a telephoto lens and that the object illumination is effected by a light spot surrounding the mark produced from the same light source via reflectors. Thus, there are provided to a certain extent the zones of illumination one of which is the centrally reflected light source which is surrounded by a larger, for example, circularly charged light spot. The object to be aimed at is therefore in the small diameter, brightly lit aiming point, spot or zone whilst its surroundings are illuminated by the surrounding light spot.

In a preferred construction of the subject-matter of the invention the distance of the light source from the telephoto lens is so selected that at least a part of the light source is projected as a bright spot a shutter being positioned between the negative part system of the telephoto lens, and the light source on the side of which, turned towards the telephoto lens a mirror is provided directed inwards and widening considerably towards the telephoto lens, the generated lines of which are inclined to the axis of the lens and its dimensions and its arrangement between the light source and the telephoto lens being so arranged that its image is projected as bright ring around the bright spot of the light source projection.

In order to increase the brightness yield it is advantageous to arrange a spherical mirror behind the source of light such that the brightsource is in the spherical centre of the mirror.

If, as a light source, a filament is used then this should be arranged on the axis of the lens and perpendicular thereto, thus by suitable dimensioning of the shutter the bright spot projected from the lens as an image of the filament appears as a more or less wide bright line. This bright line is now surrounded by the bright ring which results as a projection of the said conical mirror whereby the circular surface surrounded by the bright ring with the exception of the area representing the projection of the filament appears substantially darker than the ring and the filament projection.

If now, such a projector is disposed on a firearm, for example, a rifle or a gun such that the filament projection extends purpendicularly or horizontally whereby the filament projection and the darker field surrounding it permits an extraordinarily accurate aiming in the bright ring. At a distance of about 60 m. targets in the order of magnitude of 10–15 cm. diameter can be hit with great certainty by the bullet fired by a skilled marksman (with suitable choice of the size of the projection). At the same time the bright ring permits of recognizing the object of the aim and its surroundings sufficiently accurately in order, for example, to avoid hunting accidents.

If a still more accurate aiming is to be rendered possible then there is the possibility in the simplest mannor to divide the filament projection by covering a part of the filament in the direction of the telephoto lens, for example, by means of a wire so that there in the bright spot of the filament projection a dark line marks the centre. Thus to a certain extent a crosswire built up from the bright line and a dark cross line can result. The covering is effected suitably by means of an opaque thread, for example, a metal wire disposed as close as possible to the filament and purpendicularly to the axis of the lens and to the filament. It may, for example, be disposed on the end of an micandescent lens but outside it thus rendering to unnecessary to use special micandenscent lamps.

As a rule the dispension of a beam from the projector is so arranged that at an average shooting distance a sufficiently large field is illuminated without having to sacrifice accuracy of aiming. At quite short distance this would of course mean that only an exceptionally small field of projection would be illuminated which in addition would be so bright that the surroundings would appear completely dark. In order now to allow for obtaining even at quite short distances a sufficient general brightness compared with which however the bright ring and the filament projection came up still considerably brighter here is provided between the negative and the positive part system of the telephoto lens a second conical mirror directed inwards and widening from the negative to the positive part system of the telephoto lens which mirror deflects the strong light allowed past by the shutter and also a part of the direct light coming from the luminous column through the negative part system of the telephoto lens and thereby allows of pfoducing a moderate brightness of wide dispersion relative to the remaining projection. At greater distance the brightness of this general illumination is too small to act in a detremen- tally.

There is furthermove provided with advantage in the optical system a target point which is formed as a shadow inside the bright spot. This target point or its shadow renders possible a particularly accurate sighting. Thus, the shadow can continue also as far as into the space. The target point giving the shadow may be mounted, for example, on a sleeve on the bulb. The device according to the invention is especially satisfactory in use when constructed of light weight and small dimensions with a high light yield. For this a sodium vagous lamp is used as a light source. This bulb is then fed via an accumulator which can be carried on a carrying beld. The bulb has for example, a power of 50 watts. For conducting away the heat developed by in the metal tube forming the casing has on its upper side above an opening an oblong attachment with air supply and air lead off openings. This attachment with its openings therefore serves for ventilation of the inside of the casing.

In order to prevent moisture, for example, rain water penetrating via the openings into the casing these openings may be inched downwards. In order to keep the vibrations occurring upon shooting as far away as possible from the bulb a plastic cover on the like is shrunk onto the metal tube in a preferred construction of the subject matter of the invention, which dampens the vibrations. Such a damping element may also be provided or the weapon with the holding means of the aim projector.

For connecting the aiming projector to a weapon a rapid locking means is advantageously provided. This may, for example, be formed as a toggle locking means so that two half shells are provided which are closed with a clamp.

In order to co-ordinate the direction of projection of the aiming projector with that of the weapon a rapid locking means is advantageously connected to the foresight carrier of the weapon.

For adjustment of the aim projector adjusting screws may also be provided. The lateral or perpendicular deviation of the line of projection with the direction of shooting is corrected by these adjusting screws. Thus in particular the aim projector can be adjusted to different ranges.

If the aim projector is used, for example, with a sub-machine gun then there is provided at the rear end of the aim projector an operating knob for the switching on and off of the bulb. This operating knob may then project from the casing of the aiming projector level with the magazine guide so that it can be operated with the thumb of the user's left hand. In this way the aiming projector being capable of being switched on only with the drawing out of the weapon which can lead to accidents is obviated.

Color filters may also be provided which can be pivoted selectively into the part of the beam of the aiming projector. These colour filters may, for example, be separated for the filament projection spot and for the surrounding annular space. The target sighted is then therefore shown in color.

The invention is illustrated in more detail in the following drawings with reference to embodiments there of providing further important features.

FIG. 1 Shows a diagrammatic longitudinal section through a projector with projection image reproduced before it, FIG. 2 Shows the filament and the conical mirror disposed between it and the telephoto lens with partial path of the beam, FIG. 3 Shows a representation with another partial path of the beam similar to FIG. 1, FIG. 4 Shows the second conical mirror with partial path of the beam accommodated in the telephoto lens, FIG. 5 Shows a section corresponding to FIG. 1 from which at the same time the casing is visible;

FIG. 6 Shows a section through the metal to be with attachment,

FIG. 7 Shaws a section along the line VII—VII of FIG. 6;

Figure 6:
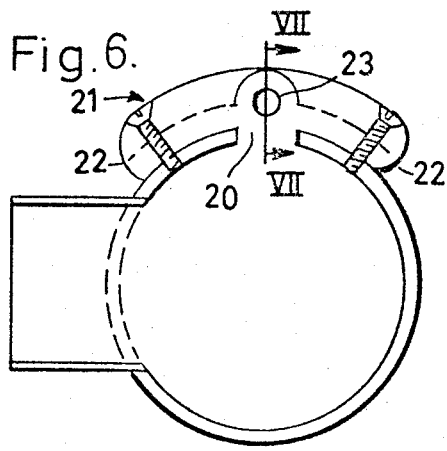

First of all FIGS. 1 to 4 will be discussed in which a metal tube 1 serving as a frame of the projector of FIG. 1 houses the positive part system 2 of a telephoto lens directly located with the negative part system 3 in a holder 4. Between the positive part system 2 and the negative part system 3 a conical sleeve 5 is provided in which has on its inside a mirror 6. The holder 4 closes the whole inside diameter of the tube 1 with the exception of a central passage 4' in which in this control passage 4' on the one hand the negative part system 3 of the telephoto lens is located. The passage 4' trigers in the direction of the filament 7 serving as a light source, that is, in that it widens towards the telephoto lens having a conical inner face which is formed as a mirror 8. The holder 4 acts at the same time as a shutter 4'' provided between the telephoto lens and the filament 7. Behind the filament 7 which belongs to a bulb, for example, a Hallogen bulb, and which is disposed perpendicularly to and on the axis of the lens 8 there is a spherical mirror 10 in the spherical centre of which is located the filament 7. The mirror 10 reflects the light coming from the filament 7 as indicated by the arrow 11, to the filament 7 giving a certain scattering of the beam because of the elongated charge of the filament. This disposed or light is in so far as it can penetrate through the shutter 4'' positively desired.

As this is still to be discussed with regard to FIGS. 2 and 3 a part of the light coming from the filament 7 directly or via the mirror 10 which light passes through the shutters 4'' puts the conical mirror 8 (see also FIG. 2) before the telephoto lens and is reflected therefrom to the telephoto lens so that there results a particularly bright annular illuminated zone which is shown in FIG. 1 as a projection zone in the annular zone 12.

The greatest part of the light (see FIG. 3) not falling in the mirror 8 but passing through the shutter 4'' shown on the left in FIG. 1 giving the bright filament projection spot 13 whereby between the ring 12 and the bright spot 13 a relatively darker heavily drawn field remains. In the bright spot 13 by covering a part of the filament 7 a darker crosswise line 14 can be produced which corresponds to the shadow of a target point 15 shown in FIG. 8.

In FIG. 2 it can be seen how the mirror 8 reflects to light from the filament 7 falling on it through the shutter 4''. This annularly disposed reflected light 8' as can be seen in FIG. 2, is added in this area to the light shown in the area 8' in FIG. 3 as light of the filament 7 passing directly through the shutter 4'' (without contact with the mirror 8) whereby the particular brightening of this area is explicable. The light shown in the central area 7' of FIG. 3 passing directly through the shutter 4'' and without contact with the mirror 8 which light due to the brightness of the area of the filament 7 due to the spherical mirror 10 (discussed under FIG. 1) is again especially bright and gives the bright spot 13 in FIG. 1. The stray light indicated in FIG. 3 by 6', in FIG. 4 by the same reference, meets the mirror 6 of the sleeve 5 and is reflected there from is strong light 6''. If this area were also shown in FIG. 1 then a very weakly illuminated space would result which would be limited by the casting of a shadow of the edge of the tube 1 acting as an edge, the shutter 1' therefore may be large with respect to the annular space 12. Thus the stray light otherwise absorbed by a black minor coating in projectors is made effective for short-range illumination. As a rule a projector of the type discussed is previously firmly mounted for certain purposes whereby there should be made provision for changing the bulb not shown, and because of the filament not too accurately adjusted in these bulbs an adjustability of the bulbs is height and laterally is required. An adjustment in the direction of the axis of the object may be provided.

The projector may thus have the following data mentioned only by way of approximation and inample:

positive part system 2 8.0 D; f'' equals plus 125mm; + B, O D// + 125 mm $f$;

Negative part system 3 16.0 D; f' equals minus 62.4 mm; 16, O D// − 62.4 mm $f$;

Radius of the mirror 10 = 33 mm; optical distance from 2 to 3 = 96 mm., optical distance of the filament 7 from the negative part system 3 = 42 mm., inclination of the generated lines of the mirror 8 to the axis of the lens 9 = about 12°, diameter of the shutter 4'' = about 9 mm.

It is however also possible to use a so called rubber as a telephoto lens whereby it is then possible to adjust the projection image 12, 13 shown by way of example in FIG. 1 according to the target distance.

Figure 9:
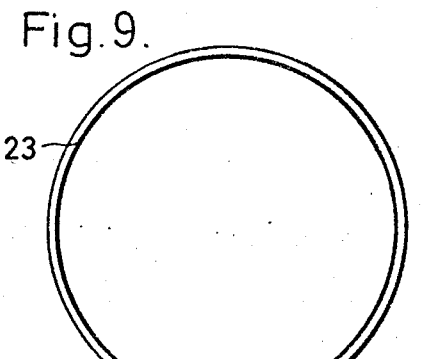
FIG. 9 Shows the holding means of the aim projector with the rigid locking means and, FIG. 10 Shows a view of an aim projector according to the invention mounted on a sub-machine gun.

The projector may be provided with suitable connecting lens for firing to a weapon which are shown in detail in FIG. 9.

Because of its extraordinary accuracy of aim the projector may also serve for measuring purposes whereby really accurate angle adjustments can be obtained.

Figure 7:
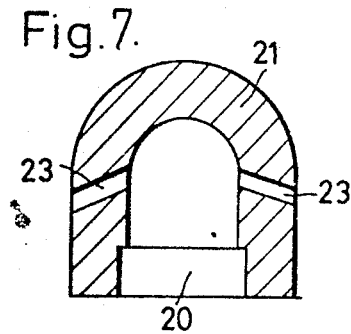
Figure 8:
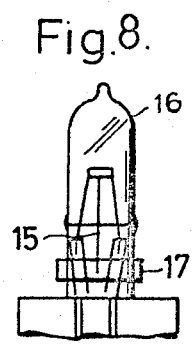
FIG. 8 Shows a detail of the holding means of the bulb with the target point.

From FIG. 5 a sodium vapour lamp 16 with filament 7 can also be seen. FIG. 8 shows in detail a sleeve 17, which carries the target point 15. In FIG. 5 an operating knob 18 can also be seen which is shown in its position in respect of a sub-machine gune also in FIG. 10. In FIG. 5 a clamp 19 of the rapid locking means is shown. As plastic tube may be shrunk on over the metal tube 1 according to FIGS. 1 or 5 for damping the vibrations.. FIG. 6 shows a cross section through this metal tube in which an opening 20 is provided at the top over which an attachment 21 is located. This attachment 21 has further openings 22, 23 for the outlet of air. From FIG. 7 it can be seen that the openings 23 run obliquity downwards so that no rainwater can penetrate.

FIG. 9 shows the firing of the aiming projector. In this a clamping block 122 is provided (see also FIG. 5) which carries on its upper side two tension springs 123 which surround the metal tube 1. These turnover springs are fixed by means of a screw 24 on the clamping block 122. A clamp screw 25 lies opposite the knucled screw 24.

Underneath there connects a stationary half shell 26 with the clamping block 122 a second half shell 27 being rotatably connected along an aixle 28. This rapid locking means is closed by means of a clamping stirrup 29 with a clamping lever 30.

The half shells 26, 27 carry at the side of these cylindrisal recesses a foamed material layer 31. A further screw 32 serves as a firing and adjusting screw. It is locked by means of a counter nut 33.

Figure 10:
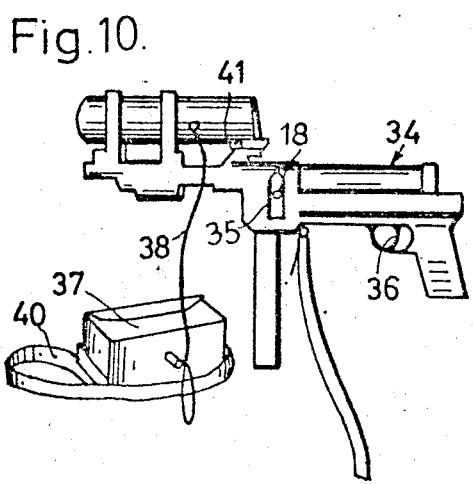

FIG. 10 shows an aiming projector according to the invention, which is mounted on a sub-machine gun 34. In this representation there is also seen the operating knob 18 which is provided level with the magazine guide 35. The draw off lever is indicated at 36. In this Figure it is furthermore shown that the aiming projector extends neither beyond the front or rear of the barrell. It is therefore of particularly handy construction. FIG. 10 furthermore shows an accumulative 37 which is committed to aiming projector by means of a cable 38. FIG. 5 also shows the plug socket 39 for this cable. The accumulator is carried by means of a carrying strap 40.

It can be seen that the aiming projector can be used without attention on the weapon 34. In doing so it is carried by the base of the foresight 41. With the aiming projector a distant illuminating source of light is obtained with the aiming projector which shines, for example, 100 to 200 hrs. and at the same time the actual aiming projector takes up a very small space and is easily constructed. In one embodiment the apparatus weighs only about 600 to 800 grammes and the accumulator 37 about 1,800 grammes. By connecting a rubber lens known per se in addition on substantial beaming can be attached so that the light beam illuminate, for example, at 100 meters the same diameter as at 50 meters if this is desired.

We claim:

1. Projector for aiming at an object and indicating the point of aim comprising, in combination, an elongated generally tubular housing, a shutter mounted within said housing separating said housing into forward and rearward portions provided with a generally circular central aperture extending therethrough for blocking the passage of light except through that aperture, a light source disposed in said rearward portion of said housing in general alignment with said aperture, a lens system disposed in said forward portion with the axis thereof being in general alignment with the center of said aperture for projecting a beam of light defined by said aperture generally axially forwardly of said housing to brightly illuminate such object at the point of aim of the projector and a generally conical internally reflective mirror flaring outwardly forwardly of said aperture for reflecting light from said source into said lens system for projection thereby generally forwardly of said housing in a widened beam defined by said mirror to provide a ring of lesser illumination to said object surrounding the aiming point.

2. Projector defined in claim 1 wherein said mirror extends between said aperture and said lens system.

3. Projector defined in claim 2 further comprising a second generally conical mirror flaring generally forwardly extending substantially entirely around said lens system.

4. Projector defined in claim 3 further comprising a spherical mirror portion positioned generally rearwardly of said light source with the center thereof substantially at said light source to reflect backlight from said source forwardly through said aperture.

5. Projector defined in claim 1 further comprising a line reticle disposed generally forwardly of said light source for dividing the aiming point beam and providing a darkened line generally centrally of the projected aiming point.

6. Projector defined in claim 1 further comprising a spherical mirror portion positioned generally rearwardly of said light source with the center thereof substantially at said light source to reflect backlight from said source forwardly through said aperture.

7. Projector defined in claim 1 wherein said light source comprises an elongated filament extending substantially perpendicular the axis of said lens system, said lens system forming the image of said filament on said object to define said aiming point.

8. Projector defined in claim 7 further comprising means positioned generally forwardly of said filament extending generally perpendicular thereto for casting a shadow thereacross and across the image thereof projected on the object by said lens system for more closely defining the aiming point.

9. Projector defined in claim 8 wherein said light source comprises a sealed bulb and said last-mentioned means comprises a sleeve mounted externally thereto.

10. Projector defined in claim 1 wherein said lens system comprises a negative lens generally adjacent said aperture and a positive lens generally forwardly thereof and further comprising an internally reflective generally conical mirror widening from the negative lens to the positive lens.

* * * * *